United States Patent [19]

Morena

[11] Patent Number: 5,514,629
[45] Date of Patent: May 7, 1996

[54] FUSION SEALING MATERIALS AND USE IN CRT

[75] Inventor: Robert Morena, Lindley, N.Y.

[73] Assignee: Corning Incorporated, Corning, N.Y.

[21] Appl. No.: 352,510

[22] Filed: Dec. 9, 1994

[51] Int. Cl.$^6$ .................................................... C03C 8/24
[52] U.S. Cl. .......................... 501/15; 501/18; 501/17; 501/24; 501/32
[58] Field of Search .................... 501/15, 17, 18, 501/24, 32; 313/480

[56] References Cited

U.S. PATENT DOCUMENTS

| | | | |
|---|---|---|---|
| 4,314,031 | 2/1982 | Sanford et al. | 501/45 |
| 4,877,758 | 10/1989 | Lee et al. | 501/24 |
| 4,940,677 | 7/1990 | Beall et al. | 501/45 |
| 4,996,172 | 2/1991 | Beall et al. | 501/45 |
| 5,021,366 | 6/1991 | Aitken | 501/45 |
| 5,071,795 | 12/1991 | Beall et al. | 501/44 |
| 5,089,446 | 2/1992 | Cornelius et al. | 501/15 |
| 5,122,484 | 6/1992 | Beall et al. | 501/15 |
| 5,153,151 | 10/1992 | Aitken | 501/45 |
| 5,179,046 | 1/1993 | Francis et al. | 501/19 |
| 5,246,890 | 9/1993 | Aitken et al. | 501/15 |
| 5,256,604 | 10/1993 | Aitken | 501/45 |
| 5,281,560 | 1/1994 | Francis et al. | 501/15 |

*Primary Examiner*—Mark L. Bell
*Assistant Examiner*—David Sample
*Attorney, Agent, or Firm*—Milton M. Peterson

[57] ABSTRACT

A fusion seal between two surfaces, and a material to produce the seal, consisting essentially of 60–85 percent by weight of a SnO—ZnO—$P_2O_5$ glass frit and 15–40 percent by weight of a mill addition including an additive selected from the group consisting of 15–40% zircon and 15–40% of an alumina-zircon mixture in which the alumina content is less than 10%, the additive amounts being based on the sealing material total, the mill addition being present in sufficient amount to provide a set point of at least 300° C. The effect of the mill addition in a fusion seal finds particular application in uniting the faceplate and funnel members to form a cathode ray tube envelope.

17 Claims, 2 Drawing Sheets

FUSION SEALING MATERIALS AND USE IN CRT

RELATED APPLICATION

U.S. application Ser. No. 08/221,400 was filed Mar. 31, 1994 in my name and assigned to the same assignee as this application. It became abandoned on Sep. 12, 1995 and has been replaced by a continuation-in-part application Ser. No. 512,618 filed Aug. 8, 1995. It relates to a sealing material consisting essentially of 60–90% of a SnO-ZnO-$P_2O_5$ glass frit and 10–40% of a mill addition including 10–30% alumina, and 0–30% zircon. The mill addition results in a seal that exhibits non-viscoelastic behavior and thus remains relatively constant up to a bakeout temperature of 380°–400° C. so that the seal remains rigid.

FIELD OF THE INVENTION

A fusion sealing material for joining two surfaces and being a mixture of a tin-zinc-phosphate glass frit with a mill addition to increase the set point.

BACKGROUND OF THE INVENTION

The invention is broadly applicable to joining glass, metal and ceramic components. However, it is particularly applicable to producing envelopes for cathode ray tubes, and the description is so directed.

It is customary in producing cathode ray tube envelopes to press funnel and faceplate components separately. These components are then joined with a fusion seal employing a mid-temperature sealing glass frit.

Lead-zinc-borate sealing glasses, both crystallizing and non-crystallizing, have been used commercially for this purpose over a long period of time. These glasses have proven very successful for the purpose. However, there has been a continuing search for a sealing material that would retain all of the attributes of the lead glasses, but would further improve on some of their features.

A driving force in this search has been a desire for a glass having an even lower sealing temperature than the lead-zinc-borate type glass. Such a lower sealing temperature would be more compatible with thermally sensitive components and coatings present in electronic products such as cathode ray tubes. More recently, the search has been accelerated by the desire to eliminate lead for health and safety reasons.

The materials search led to development of tin-zinc-phosphate glasses as described in U.S. Pat. Nos. 5,246,890 (Aitken et al.) and 5,281,560 (Francis et al.). The glasses described in these patents are lead-free, and provide somewhat lower sealing temperatures in the range of 400°–450° C.

The Aitken et al. glasses are of particular interest for use in producing seals in cathode ray tube envelopes because of their relatively low tin oxide contents. These glasses are lead-free and have compositions containing 25–50 mole % $P_2O_5$ and SnO and ZnO in amounts such that the mole ratio of SnO:ZnO is in the range of 1:1 to 5:1. The glass compositions may further contain up to 20 mole % of modifying oxides including up to 5 mole % $SiO_2$, up to 20 mole % $B_2O_3$, up to 5 mole % alkaline earth metal oxide, and up to 5 mole % $Al_2O_3$. They may also contain one or more crystallization promoters selected from 1 to 5 mole % zircon and/or zirconia and 1–15 mole % $R_2O$. Additionally, the composition may include a seal adherence promoter selected from up to 5 mole % $WO_3$, up to 5 mole % $MoO_3$, up to 0.10 mole % Ag metal and mixtures.

In producing a sealing material, mill additions to the sealing glass may be made in amounts up to about 30% by weight with no more than 15% being preferred. These additions are made to provide a sealing material having a lower effective coefficient of thermal expansion (CTE). The mill additions include metal pyrophosphate crystalline materials, cordierite, solid solutions of beta-spodumene or beta-eucryptite, silica and quartz glasses and Invar.

The manufacturing process for cathode ray tubes imposes severe restraints on a flit intended for use in sealing envelope components. One such restraint arises from the need to conduct the sealing operation at temperatures below 450° C. Higher temperatures would exceed the strain point of the funnel glass. This requirement, in turn, necessitates that the viscosity of a sealing frit must be in the range of $10^2$–$10^3$ MP·as ($10^3$–$10^4$ poises) in the temperature range of 440°–450° C. Otherwise, the frit will have insufficient flow to form a seal with a strong hermetic bond.

Following the sealing operation, the panel-funnel assembly is reheated under vacuum to a temperature in the range of 300°–400° C. in an exhaust bake-out process. This bake-out removes volatile constituents of the electronic system. It establishes the needed vacuum level in the tube to assure long tube life. The frit requirement for this second step in the process is essentially the opposite of that needed for successful sealing. To survive the exhaust bake-out, the frit must be rigid at exhaust temperatures. This requires a minimum viscosity of $10^8$ MP·as ($10^9$ poises) to avoid movement in the seal and resulting breakage or loss of vacuum.

These dual viscosity/temperature requirements are met currently by employing high lead frits in the PbO—ZnO—$B_2O_3$ system that form a crystallized seal. These lead frits are initially vitreous, but have a small amount of zircon or alumina added as a mill addition to induce crystallization. The frits exhibit excellent flow during the initial portion of the hold at the 440°–450° sealing temperature. Near the end of this hold period, they undergo rapid crystallization to a degree greater than 95%. This forms a strong, rigid seal which remains rigid during the exhaust bake-out process.

Frits in the SnO—ZnO—$P_2O_5$ ternary system exhibit good flow properties at temperatures as low as 360° C. They also have expansion coefficients close to the 95– 100×$10^{-7}$/°C. range characteristic of current panel and funnel glasses. However, the glass frits are relatively resistant to crystallization. While it is possible to crystallize them with a combination of additives, the extent of crystallization is relatively low. Consequently, the crystallized material behaves essentially as a vitreous frit. As a result, these frits form good seals, but have not been successful in surviving the exhaust process.

Currently, there are two schools of thought relative to the bakeout process. Traditionally, bakeout temperatures close to 400° C. have been required. However, presently it is thought that bakeout temperatures below 350° C. may be satisfactory. The present invention is predicated on adoption of the lower temperature bakeout.

My related application, Ser. No. 08/221,400, addresses the problem with a sealing material consisting essentially of a 60–90% SnO—ZnO—$P_2O_5$ glass frit and 10–40% of a mill addition including 10–30% alumina and 0–30% zircon. The mill addition causes the sealing material to undergo a substantial change after formation of a seal. Specifically, the seal does not undergo a decrease in viscosity when the seal is reheated. As a result, a seal exhibits non-viscoelastic behavior and the viscosity remains relatively constant up to a bakeout temperature of 380°–400° C. so that the seal remains rigid.

The present invention adopts a rather different approach. It also employs a sealing material based on a SnO—ZnO—$P_2O_5$ sealing glass frit that is modified by a mill addition. However, it utilizes a mill addition that increases the material set point, rather than exhibiting non-viscoelastic behavior. Thus, it does not impart a relatively constant viscosity-temperature relationship as a seal is reheated. Rather, it increases the effective set point so that a seal remains relatively rigid at a bakeout temperature of 330° C.

SUMMARY OF THE INVENTION

The invention resides in a fusion sealing material consisting essentially by weight of 60–85% of a SnO—ZnO—$P_2O_5$ glass frit mixed with 15–40% of a mill addition including an additive selected from a group consisting of 15–40% zircon and 15–40% of an alumina-zircon mixture in which the alumina content is less than 10%, the additive amounts being based on the sealing material total, the additive being present in sufficient amount to provide a sealing material having a set point of at least 300° C.

The invention further resides in pan in a fusion seal between the surfaces of two bodies, the fusion seal consisting essentially by weight of 60–85% of a SnO—ZnO—$P_2O_5$ glass and 15–40% of a mill addition including an additive selected from a group consisting of 15–40% zircon and 15–40% of an alumina-zircon mixture in which the alumina content is less than 10%, the additive amounts being based on the sealing material total, the additive being present in sufficient amount to provide a sealing material having a set point of at least 300° C.

The invention also resides in a method of using the sealing material to produce a cathode ray tube envelope which comprises forming a mixture comprising 60–85% by weight of SnO—ZnO—$P_2O_5$ sealing glass frit and a mill addition including an additive selected from a group consisting of 15–40% zircon and 15–40% of an alumina-zircon mixture in which the alumina content is less than 10%, the additive amounts being based on the sealing material total, the additive being present in sufficient amount to provide a sealing material having a set point of at least 300° C., applying the mixture between peripheral surfaces of funnel and faceplate members, heating the assembly to sealing temperature to produce a seal, cooling and subsequently reheating the sealed envelope under vacuum to a bakeout temperature not exceeding 350° C.

BRIEF DESCRIPTION OF THE DRAWING

In the accompanying drawing.

PRIOR ART in addition to the patents already mentioned, prior patents of possible interest are listed in an accompanying document.

DESCRIPTION OF THE INVENTION

Figure 1:
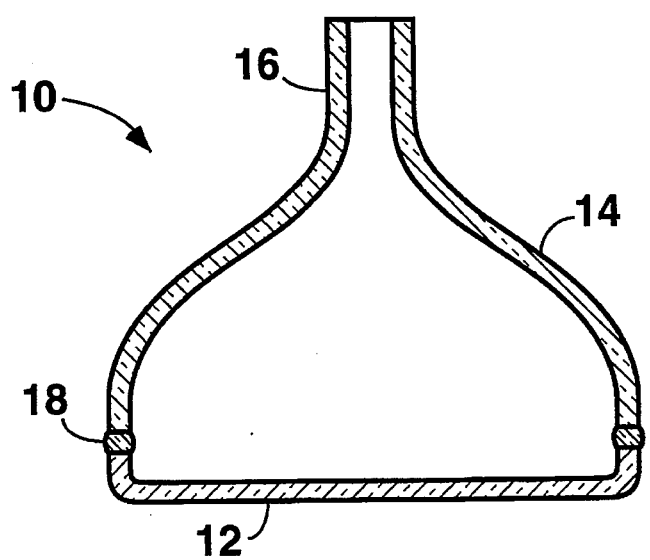
FIG. 1 is a side view in cross-section of a typical cathode ray tube envelope showing a fusion seal between the funnel and panel members.

FIG. 1 in the accompanying drawing shows a typical CRT envelope blank 10 composed of a the plate portion 12, a tunnel portion 14 and a neck portion 16. Faceplate 12 and tunnel 14 are joined by a fusion seal 18 between the peripheral edges of the faceplate and tunnel. The present invention is primarily concerned with fusion seal 18, and with an improved material for, and method of, producing that seal.

In producing seal 18, I employ the SnO—ZnO—$P_2O_5$ sealing glasses disclosed in the Aitken et al. patent, and described in the Background section of this application. Accordingly, the teachings of that patent, in their entirety, are incorporated herein by reference.

It is a feature of the present invention that appreciable quantifies of certain crystalline materials are added as mill additions to powdered SnO—ZnO—$P_2O_5$ glass frits as disclosed in the Aitken et al. patent. It is, of course, well known to make mill additions to sealing glasses, primarily to lower the effective CTE of the glass frit. In fact, the Aitken et al. patent discloses several mill additions for that particular purpose.

The present invention contemplates the optional use of such additions for that purpose, and in an amount up to 15% of the sealing material. These additives include cordierite, metal pyrophosphates, beta-spodumene and beta-eucryptite, quartz, silica glasses and Invar. The partial substitution neither enhances nor detracts from the effect of the zircon-alumina additive that is characteristic of the present invention.

The present mill addition requires at least 15% zircon alone, or at least 15% of a zircon-alumina mixture to create an effective set point. Up to about 40% may be employed without seriously impairing sealing at about 450° C. Although alumina is not required for an increased set point, it is generally preferable to employ a mixture of alumina and zircon with the alumina less than 10%. The presence of alumina is desirable since it enhances the mechanical strength of a seal.

The mill addition then includes 15–40% zircon, with or without up to 10% alumina. It optionally contains 0–15% of the aforementioned CTE-reducing additive. All amounts are based on the total sealing mixture being taken as 100%. The mill addition will constitute 15–40% of the total mixture.

The present invention is founded on the discovery that a mill addition of zircon, alone or in conjunction with up to 10% alumina, to a SnO—ZnO—$P_2O_5$ glass frit produces a substantial effect on the set point of the resulting sealing material. The effect of the mill addition is to increase the set point of the fused mixture to such an extent that a seal remains relatively rigid during a bakeout providing the bakeout temperature does not exceed about 350° C., preferably about 330° C. The set point is that temperature above which the viscosity in a seal is sufficiently low that deformation can occur during a vacuum bakeout. That viscosity is about $10^8$ Mp·as ($10^9$ poises).

In developing the present invention, three base glass frits have been employed. These glasses have compositions, as calculated in mole % from the glass batches, as follows:

|   | 1 | 2 | 3 |
|---|---|---|---|
| $P_2O_5$ | 32.0 | 31.5 | 33.0 |
| $Al_2O_3$ | 0.7 | 0.6 | — |
| CaO | 1.0 | — | — |
| ZnO | 14.6 | 14.6 | 14.9 |
| SnO | 51.2 | 51.2 | 52.1 |
| $WO_3$ | 0.5 | 0.6 | — |
| $B_2O_3$ | — | 1.5 | — |

Figure 3:
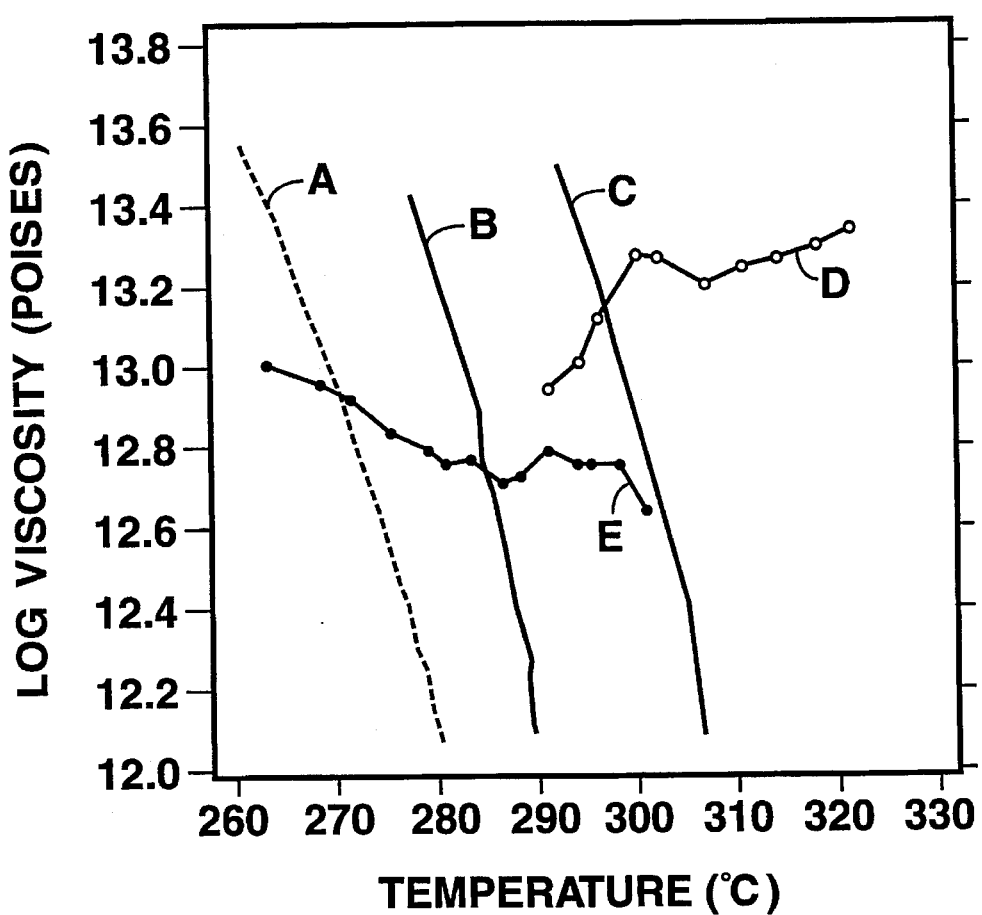
FIGS. 2 and 3 are graphical representations illustrating the present invention.
Figure 2:
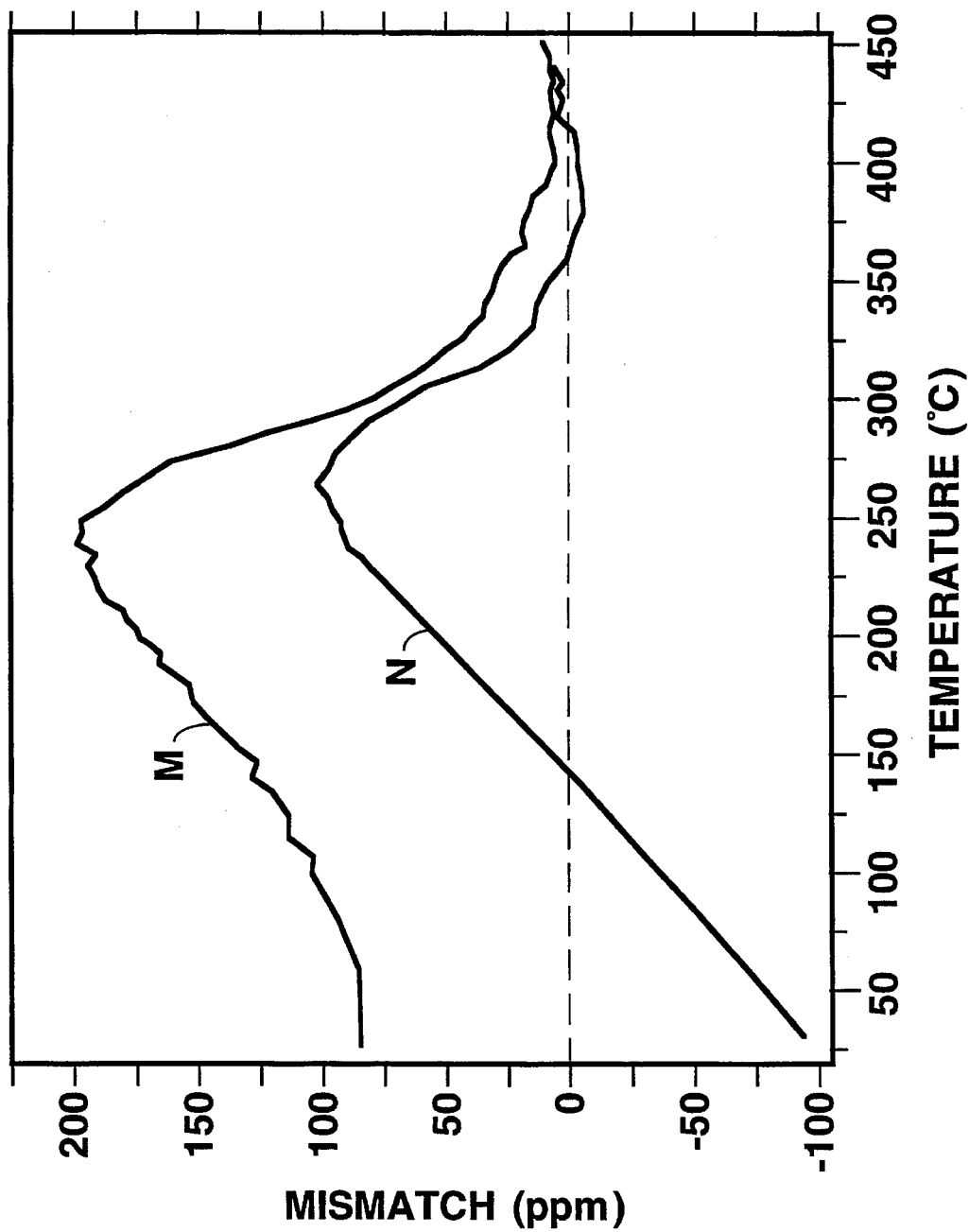

Example 3 is the glass frit used in the systems A, B, D, E and M described infra, and illustrated in FIGS. 2 and 3. Example 2 is the composition of the modified frit used in systems C and N. Example 1 is a further modification that may be employed where $B_2O_3$ is considered undesirable.

The glass of Example 2 was employed with a mill addition composed of alumina and zircon to provide a sealing material composed of, in weight %: 72% glass frit, 21% zircon and 7% alumina, the system C shown infra. This system is designed for forming a seal at a temperature of 440°–450° C., and for withstanding a bakeout at a temperature of 320°–340° C.

It will be observed that Examples 1 and 2 represent substitutions of CaO and $B_2O_3$, respectively, for $P_2O_5$. Also, $WO_3$ is present in both compositions 1 and 2. It has been found that these substitutions, as well as substitutions of other alkaline earth metal oxides, such as BaO, SrO and MgO, also tend to stiffen the glass, that is increase its set point.

Thus, the present invention is founded on two means of increasing the set point in a seal employing a SnO—ZnO—$P_2O_5$ glass frit. One means involves employing a mill addition of 15–40% of either zircon or a zircon-alumina mixture in which the alumina is less than 10%. The other means is to modify, the basic glass frit by small substitutions of $B_2O_3$ or alkaline earth metal oxides for $P_2O_5$. Accordingly, it is preferred to employ a glass frit consisting essentially in mole percent as calculated on an oxide basis of: 30–33% $P_2O_5$, 0–1% $Al_2O_3$, 0–1% $WO_3$, up to 5% of $B_2O_3$ or an alkaline earth metal oxide, preferably CaO, and SnO and ZnO in a molar ratio of about 3.5:1.

The mill addition disclosed in my companion application alters the viscosity-temperature characteristics of a seal in such a manner that a CRT envelope can be baked out at 380°–400° C. However, an undesirably high maximum tensile stress tends to develop during cooling or cycling of a seal. This may require additional strengthening.

Tensile stress occurs during cooling or reheating of a seal. The expansion characteristics and/or seal geometry of a seal and a substrate become sufficiently different so that they tend to contract away from each other. High tensile stress is a source of seal weakness that occasions a tendency for fracture or separation of the seal to occur if the stress reaches too great a value. FIG. 2 in the accompanying drawing is a graphical illustration of tensile stress development.

In FIG. 2, temperature in °C. is plotted on the horizontal axis. Mismatch, in terms of parts per million (ppm) difference between the expansion characteristics of a seal and a substrate, is plotted on the vertical axis. It is this expansion mismatch that directly creates stress during heating or cooling of a seal. The horizontal axis represents a condition where there is no difference in expansion characteristics, that is, there is zero mismatch and hence no stress. Mismatch values above that level on the y axis indicate tensile stress, while values below that level indicate compressive stress.

Curves M and N are curves illustrating how stress changes as a seal is cycled between the set point of a seal and ambient temperature. Curve N illustrates the temperature stress pattern as a seal produced in accordance with the present invention is cycled. Curve M illustrates a corresponding pattern for a sealing material in accordance with the related application. It is apparent that the maximum tensile stress developed is greater in the material represented by curve M.

Curves M and N represent measurements made on butt seals. Each seal was produced by bonding a thin layer of a sealing material to a substrate cut from a commercial cathode ray tube glass panel. The test seal in each instance was thermally cycled in a furnace. The differences in expansion (mismatch) between the sealing material and the substrate were measured employing a polariscope.

The sealing material used on the test piece for Curve M was composed of 70% glass frit and 30% mill addition. The latter consisted of 10% alumina and 20% zircon. The sealing material used on the test piece for Curve N was composed of 72% glass frit and a mill addition consisting of 7% alumina and 21% zircon. The sealing materials for Curve M employed a standard 33% $P_2O_5$ frit with a SnO:ZnO molar ratio of 3.5:1. The glass frit for Curve N was that of Example 2 above.

The distinction between the two types of alumina-zircon mill additions may be further seen in FIG. 3 of the accompanying drawing. That FIGURE is a graphical representation of viscosity-temperature curves. Temperature in ° C. is plotted along the horizontal axis, and log viscosity in 10 Mp·as (poises) is pulled along the vertical axis.

The viscosity-temperature curves are based on data obtained by measurements made on five different sealing material systems. Four systems employed a SnO—ZnO—$P_2O_5$ glass frit containing 33 mole % $P_2O_5$ and SnO and ZnO in a molar ratio of 3.5:1. The Curve C is based on a sealing material having the modified frit of Example 2. Mill additions were made in percent by weight of the sealing mixture.

The systems were:

A. Glass frit only

B. 70% glass frit plus 30% zircon, 0% alumina.

C. 72% glass frit plus 21% zircon, 7% alumina.

D. 70% glass frit plus 15% each of zircon and alumina.

E. 70% glass frit plus 20% zircon and 10% alumina.

The curves in FIG. 3 are identified by the same letter indicia as the systems.

The viscosity data plotted in FIG. 2 were obtained by a bending beam viscometer (BBV) method. In this method, a specimen in the form of a thin beam is suspended between two points with a small load suspended at the midpoint of the beam. The rate of deflection of the specimen is measured as a function of temperature. This measuring technique is particularly applicable where viscosity values in the range of $10^{11}$–$10^{12}$ MP·as ($10^{12}$–$10^{13}$ poises) are involved.

The data are based on and represent measurements made on fired bars. The bars were prepared by dry-pressing blends of frit powder together with any added mill addition. A few drops of isopropanol were added to 30 grams of the dry mix to aid in pressing. Each particular blend was made by roller milling the material in a plastic jar to provide a homogeneous mixture. This milling step was followed by sieving the material through a 100 mesh screen to break up any soft agglomerates. Each pressed bar was fired at 450° C. for one hour, a typical envelope sealing schedule, with the exception of the "glass frit only" material (A). That bar was sintered at 380° C. for one hour. Flow was too great at 450° C. to obtain the minimum thickness needed for the test beam. All of the blends showed excellent flow at their respective sintering temperature.

The viscosity-temperature curves for both the unfilled frit (A), the frit filled with 30% zircon (B), and the frit filled with the 7%/21% mix (C) are similar in nature. Each shows a sharp decrease in log viscosity with increasing temperature. This is typical of a material undergoing viscous flow. The $10^{12}$ MP·as ($10^{13}$ poise) temperature for the unfilled frit (A) was approximately 272° C. The addition of 30 parts by weight zircon to this frit (B) had a stiffening effect so that the $10^{12}$ MP·as ($10^{13}$ poise) temperature increased to 287° C. The mix for Curve C has a $10^{12}$ Mp·as temperature of about 298° C. The test specimens of these compositions showed considerable permanent curvature following the test.

However, extrapolation of Curve C to a log-viscosity value of 9 shows that the temperature will have a value of about 330° C. in the range of $10^8$–$10^9$ Mp·as ($10^9$–$10^{10}$ poises). Thus, combining a mill addition with a frit in accordance with the present invention will permit producing a seal in a CRT tube providing the tube is baked out at a temperature under 350° C.

The viscosity-temperature curves for the other two specimens (D and E) are distinctly different from those for A and B. Their log viscosity curves do not show a decrease with increasing temperature. Rather, the curves are essentially unchanged with increasing temperature. This means that a seal made with these materials will remain rigid and undeformed at bakeout temperatures up to 400° C. However, a large tensile stress maximum develops during cooling as illustrated in FIG. 2.

Thus, sealing materials with alumina-zircon mill additions containing greater than 10% by weight alumina must be used where a bakeout temperature greater than 350° C., in particular 380°–400° C., is employed. However, where a bakeout temperature lower than 350° C., in particular 320°–340° C., is employed, a sealing material containing an alumina-zircon mill addition with less than 10% alumina is preferred.

I claim:

1. A fusion sealing material consisting essentially of 60–85% by weight of a SnO—ZnO—$P_2O_5$ glass frit and 15–40 percent by weight of an alumina-zircon mixture as a mill addition in which the alumina content is less than 10%, the additive amounts being based on the sealing material total, the additive being present in sufficient amount to provide a sealing material having a set point of at least 300° C.

2. A fusion sealing material in accordance with claim 1 wherein the mixture constitutes at least 25% of the sealing material and is composed of 15–30% zircon and 5 to less than 10% alumina.

3. A fusion sealing material in accordance with claim 1 having a set point of about 330° C.

4. A fusion sealing material in accordance with claim 1 wherein the mill addition contains a further additive that reduces the effective CTE of a seal formed from the material, the further additive not being over about 15 percent by weight of the sealing material.

5. A fusion sealing material in accordance with claim 4 wherein the further additive is selected from the group consisting of cordierite, metal pyrophosphates, silica glasses, quartz, Invar and solid solutions of beta-spodumene and beta-eucryptite.

6. A fusion sealing material in accordance with claim 1 wherein the glass frit consists essentially of 25–50 mole % $P_2O_5$ and SnO and ZnO in a molar ratio of 5:1 to 2:1, and optionally contains at least one modifying oxide selected from the group consisting of up to 5 mole % $SiO_2$, up to 20 mole % $B_2O_3$, up to 5 mole % $Al_2O_3$ and up to 5 mole % $WO_3$.

7. A fusion sealing material in accordance with claim 6 wherein the glass frit consists essentially of, in mole percent on an oxide basis, 30–33% $P_2O_5$, an oxide, in an amount not exceeding about 5%. selected from the group consisting of $B_2O_3$, alkaline earth metal oxides, and mixtures, SnO and ZnO in a molar ratio of about 2:1 to 4.5:1.

8. A fusion sealing material in accordance with claim 7 wherein the selected oxide is $B_2O_3$ or CaO.

9. A fusion seal between the surfaces of two bodies, the fusion seal consisting essentially of 60–85% by weight of a SnO—ZnO—$P_2O_5$ glass frit and 15–40 percent by weight of an alumina-zircon mixture as a mill addition in which the alumina content is less than 10%, the additive amounts being based on the fusion seal total, the additive being present in sufficient amount to provide a sealing material having a set point of at least 300° C.

10. A fusion seal in accordance with claim 9 wherein the mixture constitutes at least 25% of the seal and is composed of 15–30% zircon and 5 to less than 10% alumina.

11. A fusion seal in accordance with claim 9 having a set point of about 330° C.

12. A fusion seal in accordance with claim 9 wherein the mill addition contains a further additive that reduces the effective CFE of the seal in an amount not over about 15 percent by weight.

13. A fusion seal in accordance with claim 12 wherein the further additive is selected from the group composed of cordierite, metal pyrophosphates, silica glasses, quartz, Invar and solid solutions of beta-spodumene and beta-eucryptite.

14. A fusion seal in accordance with claim 10 wherein the glass frit consists essentially of 25–50 mole % $P_2O_5$, SnO and ZnO in a molar ratio of 5:1 to 2:1 and optionally contains at least one modifying oxide selected from the group consisting of up to 5 mole % $SiO_2$, Up to 20 mole % $B_2O_3$, up to 5 mole % $Al_2O_3$ and up to 5 mole % $WO_3$.

15. A fusion seal in accordance with claim 14 wherein the molar ratio of SnO and ZnO is 2:1 to 4.5:1.

16. A fusion seal in accordance with claim 15 wherein the glass frit consists essentially of, in mole percent on an oxide basis, 30–33% $P_2O_5$, an oxide, in an amount not exceeding about 5%, selected from the group consisting of $B_2O_3$, alkaline earth metal oxides, and mixtures, and SnO and ZnO in a molar ratio of about 2:1 to 4.5:1.

17. A fusion seal in accordance with claim 9 wherein the two bodies are the panel and funnel of a cathode ray tube, and the tube is capable of being baked out at a temperature up to about 350° C.

* * * * *

UNITED STATES PATENT AND TRADEMARK OFFICE
CERTIFICATE OF CORRECTION

PATENT NO. : 5,514,629
DATED : May 7, 1996
INVENTOR(S) : Morena

It is certified that error appears in the above-indentified patent and that said Letters Patent is hereby corrected as shown below:

Column 2, line 13, "flit" should be --frit--.
Column 2, line 48, "7/°C" should be --$7/°C$--.
Column 3, line 27, "pan" should be --part--.
Column 4, line 4, "a the plate" should be --a faceplate--.
Column 4, lines 5, 6 and 7, "tunnel" should be --funnel--.
Column 6, line 30, "pulled" should be --plotted--.
Column 7, lines 4 and 9, "untilled" should be --unfilled--.
Column 8, line 35, "CFE" should be --CTE--.

Signed and Sealed this

Twenty-fifth Day of February, 1997

Attest:

BRUCE LEHMAN

*Attesting Officer*     *Commissioner of Patents and Trademarks*